United States Patent [19]

Tomori

[11] 4,309,077
[45] Jan. 5, 1982

[54] LENS BARREL CAPABLE OF AUTOMATIC AND MANUAL FOCALIZING OPERATIONS

[75] Inventor: Yasumasa Tomori, Sakado, Japan

[73] Assignee: Asahi Kogaku Kogyo Kabushiki Kaisha, Tokyo, Japan

[21] Appl. No.: 102,283

[22] Filed: Dec. 10, 1979

[30] Foreign Application Priority Data

Jan. 18, 1979 [JP] Japan .............................. 54-4718[U]

[51] Int. Cl.³ .................................................. G02B 7/04
[52] U.S. Cl. ..................................... 350/255; 354/195
[58] Field of Search ................... 350/252, 255; 354/25, 354/195, 286

[56] References Cited

U.S. PATENT DOCUMENTS

| | | | |
|---|---|---|---|
| 4,110,769 | 8/1978 | Schütz et al. | 354/195 |
| 4,153,903 | 5/1979 | Pizzuti et al. | 354/195 |
| 4,183,639 | 1/1980 | Suwa | 354/195 |
| 4,200,377 | 4/1980 | Holderbaum | 354/195 |
| 4,231,646 | 11/1980 | Iida | 354/195 |

*Primary Examiner*—F. L. Evans

*Attorney, Agent, or Firm*—Sughrue, Mion, Zinn, Macpeak & Seas

[57] ABSTRACT

A lens barrel device capable of switching easily between automatic and manual focalizing operational modes with the lens barrel device deriving its focalizing operational force from a rotary member mounted in the camera body. A corresponding rotary member in the lens barrel rotates a rotary cylinder so as to move it straight along the optical axis of the barrel with the focalizing operational force being transferred from the rotary member to the rotary cylinder through a driven member and a holding member. The driven member and the holding member are coupled to the rotary cylinder by fixing the holding member to the driven member with an edge of the driven member and an edge of the holding member confronting first and second grooves formed in the rotary cylinder. An engaging ring is fixed to the holding member. Members which engage and disengage according to the longitudinal displacement of the operating ring along the optical axis are provided between the engaging ring and the operating ring.

7 Claims, 3 Drawing Figures

LENS BARREL CAPABLE OF AUTOMATIC AND MANUAL FOCALIZING OPERATIONS

BACKGROUND OF THE INVENTION

The invention relates to a lens barrel in which the focalizing operation is effected by a drive force supplied from the camera body and is carried out by the operating ring of the lens barrel which can switch between modes.

SUMMARY OF THE INVENTION

In accordance with the invention, there is provided a lens barrel including a drive force transferring rotary member for transferring a focalizing operational force from a camera body, a rotary cylinder rotatable by the rotary member, a movable cylinder movable straightly along the optical axis of the lens barrel in response to movement of the rotary cylinder, a driven member, a holding member for transferring the focalizing operational force from the rotary member to the rotary cylinder wherein the driven member and the holding member are coupled to the rotary cylinder by fixing the holdering member to the driven member by an edge portion of the driven member and with an edge portion of the holding member confronting respectively first and second grooves formed in the rotary cylinder, an engaging ring fixed to the holding piece, an operating ring, and members which engage and disengage according to the longitudinal displacement of the operating ring along the optical axis with the members which engage and disengage being provided between the engaging ring and the operating ring. Accordingly, with respect to the focalizing operation of the lens barrel, the operating ring and the drive force transferring rotary member are made switchable.

In accordance with a preferred embodiment of the invention, there may be provided ball means disposed in cooperation with two grooves in the operating ring with a spring provided for applying an abutting force to the ball means. A distance scale may be provided either upon the engaging ring or the operating ring. Moreover, the members which engage and disengage may be provided as a protrusion on the operating ring and a matching notch provided on the engaging ring.

DESCRIPTION OF THE PREFERRED EMBODIMENTS

Figure 1:
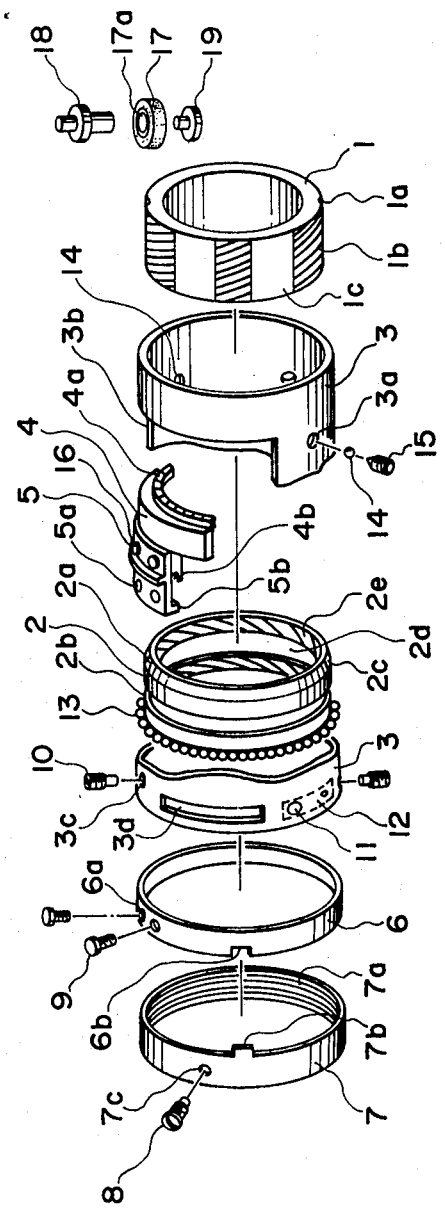
FIG. 1 is a perspective view of a preferred embodiment of a lens barrel of the invention.

A preferred embodiment of the invention will be described with reference to the accompanying drawings. In the drawings, reference numeral 1 designates a movable cylinder having guide grooves 1a. The guide grooves 1a into which extend guide pins 10 secured to a stationary ring 20 inhibit rotational motion of the movable cylinder 1 so that the latter moves only along the optical axis. Front group lenses 28a through 28d held in predetermined positions by front frame members 26a, 26b, 27a, 27b, 27c and 27d are supported by the movable cylinder 1. Rear group lenses 34a through 34c held in predetermined positions by rear frame members 32a, 32b, 33a and 33b are supported by the movable cylinder 1. Aperture diameter setting members 29, 30 and 31 are also supported by the movable member 1 so as to function in a predetermined manner.

Reference numeral 2 designates a rotary cylinder which is rotatable around the optical axis to cause the movable cylinder 1 to move straightly along the optical axis with the aid of threads 1b and threads 2e. In order to decrease to contact area of the threads 1b and 2e and to thereby decrease the rotational resistance, the portion of the movable cylinder where the threads 1b have been formed is cut at equal intervals to form flat surfaces 1c which have a lengthwise or longitudinal axis parallel to the optical axis. Also, the central part of the portion of the rotary cylinder 2 where the threads 2e have been formed is cut annularly to form a hollow cylindrical part 2d. In order to decrease the rotational friction of the cylinder 2, the inner wall of a supporting cylinder 3 and the end face of the stationary ring 20 secured integrally to the supporting cylinder 3 are so arranged as to rotatably support the rotary cylinder 2 on the supporting cylinder 3 through balls 13. A ball 14 which is rotatably positioned in the supporting cylinder 3 rotatably supports the rotary cylinder 2 on the supporting cylinder 3. The rotational position of the rotary cylinder 2 may be adjusted by an adjusting screw 15. The supporting cylinder 3 is fixedly secured to the mount which is used to mount the lens barrel on the camera body (not shown).

Reference numeral 4 designates a driven member having an end face or contact surface 4a which is roughened so that it effectively receives a focalizing operational force from a drive force transferring rotary member 17 which is adapted to transfer the focalizing operational force from the camera body. The driven member 4 and a holding member 5 are secured to the rotary cylinder 2 and to each other. It is necessary that the driven member 4 and the holding member 5 be integrally secured irrespective of the rotational position of the rotary cylinder 2 in order to adjust the distance between the image forming plane and the plane of the mount (not shown) of the camera body when the object is at an infinite distance, that is, in order to displace the movable cylinder 1 by rotating the rotary cylinder 2 for back focus adjustment. For this purpose, the driven member 4 is provided with an arcuate edge 4b which engages the edge 2c of the rotary cylinder 2. The arcuate edge 5b of the holding member 5 engages an outer wall groove 2b formed in the rotary cylinder 2. A suitable dimensional difference is provided between the center of a fixing screw 16 mounting hold formed in the holding member 5 and the center of a tapped hole in the driven member 4. A receiving space is provided to sandwich the rotary cylinder 2 and the driven member 4 and the holding member 5 effect a sandwiching action when fixed with the fixing screw 16.

Figure 3:
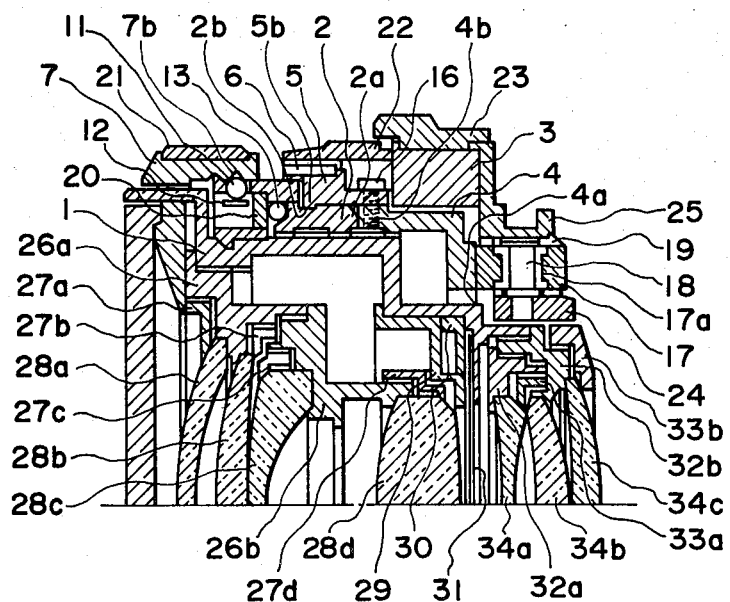
FIG. 3 is a sectional side view of the embodiment of FIG. 1 in an "A condition".

Reference numeral 6 designates an engaging ring which is secured to the holding member 5 with mounting screws 9 which are inserted through holes 6a and are tightened to tapped holes 5a. The ring 6 has a distance scale (not shown) in this embodiment. Reference numeral 7 designates an operating ring which is held by the supporting cylinder 3. The amount of rotation and the amount of movement along the optical axis of the operating ring 7 are regulated by a rotation regulating groove 3d and a regulating pin 8. The engaging ring 6 has a rectangular notch 6b while the operating ring 7 is provided with a mating protrusion 7b. The notch 6b and the protrusion 7b are used in switching between a manual condition (hereinafter referred to as "an M condition", when applicable) in which the rotary cylinder 2 is rotated by rotating the operating ring thereby to move the movable cylinder 1 back and forth along the optical axis to execute the focalizing operation and an automatic condition (hereinafter referred to as "an A condition", when applicable) in which the focalizing operation is effected in association with a drive force transferring rotary member which is adapted to transfer the focalizing operation force from the camera body (not shown) without being affected by the rotation of the operating ring 7. More specifically, by moving the operating ring 7 towards the object along the optical axis, a click wall 11 abutting the inner ball of the operating ring 7 with a click spring 12 on the supporting cylinder 3 is positioned in a click groove 7a formed in the operating ring 7, as a result of which the protrusion 7b is disengaged from the rectangular notch 6b and the rotation of the operating ring 7 is not transferred to the engaging ring 6. This action represents the "A condition" which is indicated in FIG. 3.

Figure 2:
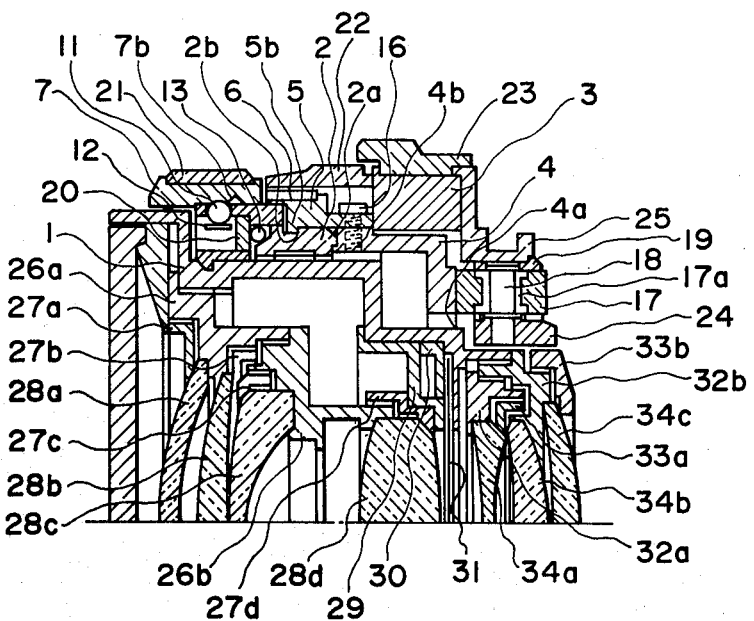
FIG. 2 is a sectional side view of the embodiment of FIG. 1 in "an M condition"

The "A condition" can be switched to the "M condition" as follows. The operating ring 7 is turned to an index (not shown) which indicates that the rectangular groove of the engaging ring 6 is confronting the protrusion 7b of the operating ring 7. Then the operating ring 7 is moved towards a mount ring 25 along the optical axis until the click ball 11 engages the groove 7a engaging the rectangular notch 6b with the protrusion 7b as shown in FIG. 2.

The width, along the optical axis, of the groove 3d is larger by a suitable value than the distance between two grooves 7a which specify the "A condition" and the "M condition". The angle of the groove 3d is larger by a suitable value than the predetermined maximum rotational angle of the rotary cylinder 2. That is, the former angle extends to suitable margins on both sides of the latter angle. The rotational angle of the rotary cylinder 2 is regulated by the two end faces along the optical axis of a window 3b formed in the supporting cylinder 3 and by the two end faces of the holding member 5.

In the above-described embodiment, the engaging ring 6 is provided with the rectangular notch 6b while the operating ring 7 has the protrusion 7b for the switching of the "A condition" and the "M condition". However, this arrangement may be replaced by one in which a pin such as the regulating pin 8 and a corresponding groove are provided. That is, all that is necessary for the arrangement is to provide an "A" and "M" conditions switching section for the engaging ring 6 and the operating ring 7. If the distance scale is provided on the engaging ring 6, a distance to an object is correctly specified for the lens barrel irrespective of whether the "A condition" or the "M condition" is chosen. If the distance scale is provided on the operating ring 7, then the distance is specified for the lens barrel only in the "M" condition".

The click ball 11 is so designed that it indicates the correct position for both the "A condition" and "M condition" with respect to the operating ring 7 by touch to the photographer and that the focalizing operation force of the lens barrel is quite small for the "A condition". Accordingly, although the rotation of the operating ring 7 can be effected relatively readily in the "M condition", the potential difficulty that the operating ring 7 may be turned by light external impact is prevented because the click ball 11 is held in abutment against the groove 7a of the operating ring by the click spring 12 cantilevered to the supporting cylinder 3.

The drive force transferring rotary member 17 is made of an elastic material having a suitable hardness so as to effectively form an integral unit with a bearing 17a and is mounted on a rotary shaft 18 with a screw 19. The rotary shaft 18 is fixedly secured to a mounting cylinder 24 which is fixed to a mount 25 so that it serves as a rotary shaft perpendicular to the optical axis. In the case where the rotary shaft is formed with a gear portion, the end face 4a of the driven piece 4 should be provided with a corresponding gear.

As is apparent from the above description, it is a feature of the construction of the lens barrel according to the invention that back focus adjustment and regulation of the range of rotation for focalization are provided for it is made possible to switch back and forth between the "A condition" and the "M condition", and the resistance force in the "M condition" can be freely adjusted.

What is claimed is:

1. A lens barrel comprising:
   a drive force transferring rotary member (17) for transferring a focalizing operational force from a camera body;
   a driven member (4) rotationally driven by said transferring rotary member and having a first edge running in a circumferential direction;
   a holding member fixed to said driven member and having a second edge running in a circumferential direction and offset along an optical axis of said lens barrel with respect to said first edge;
   a rotary cylinder having first and second grooves each running in a circumferential direction and spaced apart along said optical axis, said first and second grooves being engaged by said first and second edges, respectively, whereby said rotary cylinder is rotated by said transferring rotary member through said driven and holding members;
   an engaging ring fixed to said holding member; a manually rotatable operating ring movable along said optical axis between first and second positions; and
   coupling means provided between said engaging ring and said operating ring for rotationally coupling said operating and engaging rings in the first position of said operating ring whereby rotation of said operating ring will rotate said rotary cylinder, and rotationally decoupling said operating and engaging rings in the second position of said operating ring whereby said rotary cylinder will rotate in response to rotation of said transferring rotary member but will not rotate in response to rotation of said operating ring.

2. A lens barrel as claimed in claim 1 further comprising:
   ball means abutting a circumferential surface of said operating ring;
   third and fourth grooves in said circumferential surface of said operating ring and offset from one another along said optical axis; and
   a spring for applying an abutting force to said ball means to urge said ball means against said circumferential surface, said ball means engaging said third groove when said operating ring is in said first position and said ball means engaging said fourth groove when said operating ring is said second position.

3. A lens barrel as claimed in claim 1, in which a distance scale is provided on said engaging ring.

4. A lens barrel as claimed in claim 1, which a distance scale is provided on said operating ring (7).

5. A lens barrel as claimed in claim 1, wherein said driven and holding members are annular.

6. A lens barrel as claimed in claim 1, wherein said first and second edges face in opposite directions along said optical axis.

7. A lens barrel as claimed in any one of claims 2 to 6 wherein said members which engage and disengage comprise a protrusion provided on said operating ring and a notch provided on said engaging ring.

* * * * *